July 5, 1966 C. D. TODD 3,259,852

MULTIVIBRATOR WITH SELF-STARTING CIRCUIT

Filed Dec. 27, 1963 2 Sheets-Sheet 1

INVENTOR.
CARL DAVID TODD,
BY J. K. Haskell
ATTORNEY.

July 5, 1966 C. D. TODD 3,259,852

MULTIVIBRATOR WITH SELF-STARTING CIRCUIT

Filed Dec. 27, 1963 2 Sheets-Sheet 2

INVENTOR.
CARL DAVID TODD,
BY J. K. Haskell
ATTORNEY.

United States Patent Office 3,259,852
Patented July 5, 1966

3,259,852
MULTIVIBRATOR WITH SELF-STARTING CIRCUIT

Carl D. Todd, Costa Mesa, Calif., assignor to Hughes Aircraft Company, Culver City, Calif., a corporation of Delaware Filed Dec. 27, 1963, Ser. No. 333,985
8 Claims. (Cl. 331—52)

This invention relates generally to signal generator circuits and more particularly to signal generator circuits capable of providing continuous operation.

Signal generators known heretofore have failed to oscillate at times because of slow power supply voltage rise, subjection to heat beyond normal operating conditions, or subjection to radiation, for example. It would therefore be desirable, particularly in remote telemetry equipment, to have a signal generator with a self-starter which is inhibited by normal oscillation of the generator and which operates, repeatedly if necessary, upon failure of such normal oscillation.

It is therefore an object of this invention to provide an improved signal generator.

It is a further object of this invention to provide an improved signal generator having a self-starter which operates in response to a nonoscillatory condition of the generator.

Another object of this invention is to provide an improved astable multivibrator circuit arrangement capable of sensing and responding to a stable or nonoscillatory condition to return to an astable state.

In accordance with this invention a signal generator is provided comprising a first oscillator including a current path and having an oscillatory mode in which the path alternates between nonconduction and conduction of current and a nonoscillatory mode in which the path conducts continuously; and feedback means coupled to the first oscillator and including a second oscillator responsive to the continuous conduction of current in the path for triggering the first oscillator into the oscillatory mode.

The novel features of this invention both as to its organization and method of operation will best be understood from the following description of exemplary embodiments, taken in connection with the accompanying drawings, in which like characters refer to like parts, and in which.

Figure 1:
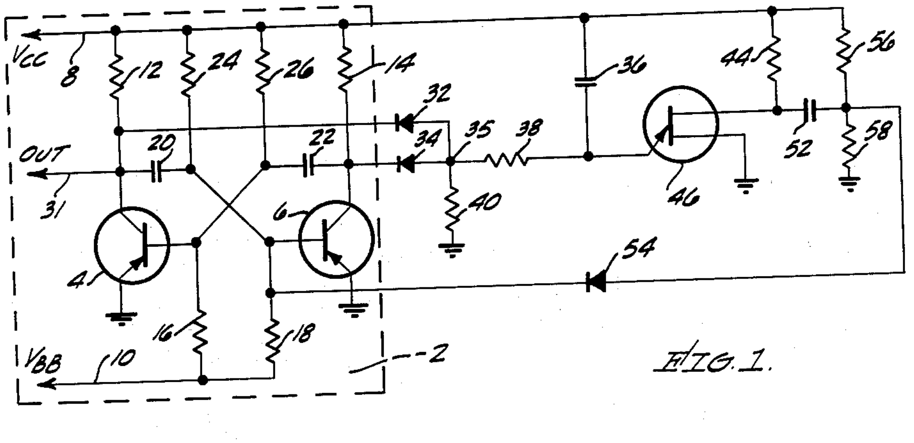
FIG. 1 is a schematic circuit diagram of a signal generator provided in accordance with one embodiment of the present invention illustrating the use of a unijunction device.

Referring now to FIG. 1, an astable multivibrator 2 is shown comprising first and second PNP transistors 4, 6 each having a collector electrode, a base electrode and an emitter electrode. One terminal 8 of a first source of direct current operating potential (not illustrated) is coupled by way of first and second load impedance elements 12, 14 to the collector electrodes of the corresponding transistors 4, 6. One terminal 10 of a second source of direct current operating potential (not illustrated) is coupled by way of first and second biasing impedance elements 16, 18 to the base electrodes of the corresponding transistors 4, 6 the other terminal of the sources of direct current operating potential may be connected along with the emitter electrodes to a point of fixed reference potential such as ground. Alternating current feedback within the multivibrator 2, a necessity for astable or free-running oscillation, is provided by a first capacitor 20 connected between the collector electrode of the first transistor 4 and the base electrode of the second transistor 6 and by a second capacitor 22 connected between the collector electrode of the second transistor 6 and the base electrode of the first transistor 4. To prevent the occurrence of a nonoscillatory mode in which neither of the two transistors 4, 6 conducts current, third and fourth biasing impedance elements 24, 26 are respectively connected between the terminal 8 and the base electrodes of the corresponding transistors 4, 6.

Assuming appropriate values for the circuit elements and operating potentials mentioned above, the multivibrator 2 will normally oscillate in an astable manner, the collector electrode of transistor 6, for example, having an output voltage represented by waveform 28 (FIG. 4) between time $t_0$ and time $t_3$, and the collector electrode of transistor 4 having an output voltage represented by waveform 30 (FIG. 4) in the same period of time. The output voltage represented by the waveform 30, may be coupled to a utilization circuit by means of the output terminal 31.

As is well known in the art, other devices such as vacuum tubes or NPN transistors may be utilized, with appropriate change of operating and biasing potentials, in place of the PNP transistors 4, 6. As will be explained below, however, the use of NPN transistors in place of PNP transistors may require other circuitry changes as illustrated by the differences between FIG. 3 and FIG. 1.

Continuing to examine FIG. 1, it will be noted that feedback means including a gated relaxation oscillator are coupled between the collector electrodes of the transistors 4, 6 and the base electrode of the second transistor 6. The general purpose and effect of this arrangement is to develop and apply an appropriate trigger pulse to cut off conduction of current in transistor 6 and thereby start oscillation of the multivibrator 2 in response to an indication that the multivibrator 2 has assumed a nonoscillatory condition in which both of the transistors 4, 6 conduct continuously. In more detail, the cathode of a first gating diode 32 is connected to the collector electrode of transistor 4, and the cathode of a second gating diode 34 is connected to the collector electrode of transistor 6, the anodes of the two diodes 32, 34 being connected to each other at junction point 35. A capacitor 36, which constitutes part of the relaxation oscillator, is coupled between the first source of direct current operating potential 8 and the junction point 35, there being a coupling element 38 which may be a small resistor connected between the capacitor 36 and the diodes 32, 34. A capacitor-charging impedance element 40 is connected between the source of fixed reference potential, ground, and the junction point 35.

Assuming an appropriate value such as 20 volts for the first source of operating potential having its negative terminal connected to terminal 8, and further assuming normal oscillation of the multivibrator 2, the above-described arrangement will result in alternate conduction of the two diodes 32, 34, thereby placing the junction point 35 at substantially the same potential as the terminal 8. This will result, in turn, in substantially no voltage drop across the capacitor 36. However, if the multivibrator 2 assumes a nonoscillatory mode in which both transistors 4, 6 conduct heavily at the same time, the above-described arrangement will result in nonconduction of the two diodes 32, 34, and the capacitor 36 begins to charge through coupling element 38 and capacitor-charging impedance element 40 thereby increasing the potential across the capacitor 36. The waveform 42 (FIG. 4) between times $t_0$ and $t_3$ represents the voltage at the junction point 35 during normal oscillation of the multivibrator 2. Between times $t_3$ and $t_4$ it represents the voltage at that junction point during the nonoscillatory mode in which both transistors 4, 6 are heavily conducting.

Figure 4:
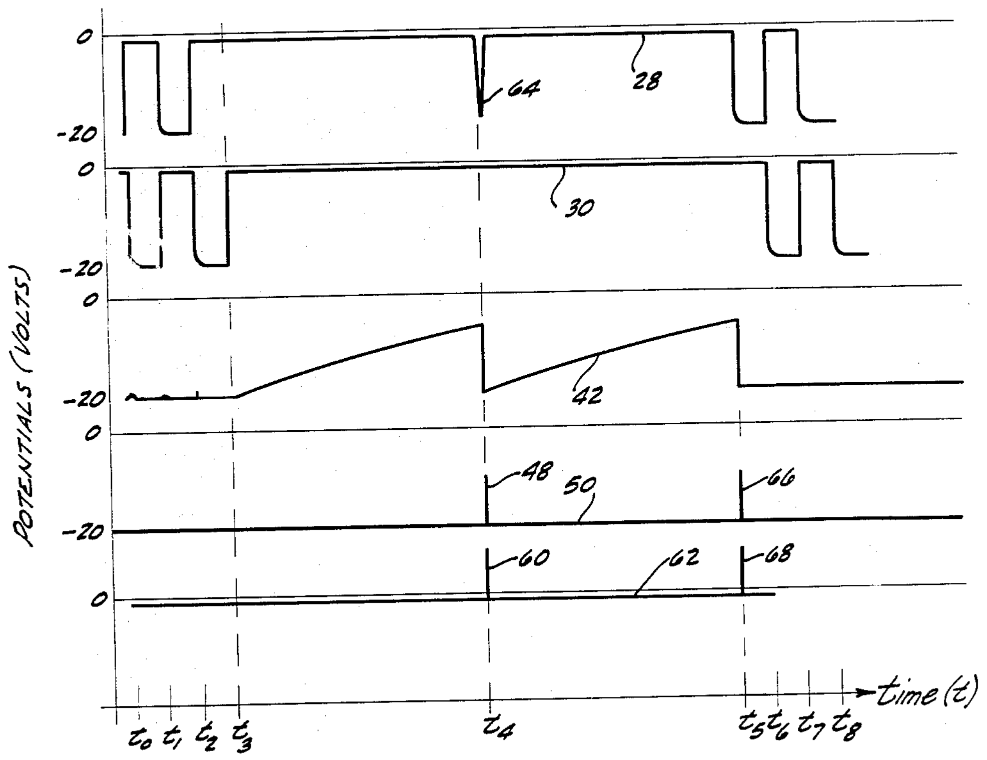
FIG. 4 is a diagram of waveshapes representing signal voltages at various points of the circuit shown in FIG. 1 for helping to explain the operation of that circuit.

Waveform 42 shows a sudden drop in voltage at time $t_4$. This is caused by the rapid discharge of capacitor 36 through a capacitor-discharging impedance element 44 (FIG. 1) as the result of the closing of switching means which may be a unijunction transistor 46 as in the circuit of FIG. 1. The unijunction transistor 46 is a semiconductor device which has two base electrodes and an emitter electrode and which fires to conduct current across the emitter-to-first base junction when the potential at the emitter electrode reaches a predetermined fraction of the potential between the two base electrodes. In the circuit of FIG. 1 the emitter electrode of the unijunction transistor 46 is connected to the terminal of the capacitor 36 most remote from the terminal 8, the capacitor-discharging impedance element 44 is connected between the terminal 8 and the first base electrode, and the second base electrode is connected to ground. Hence, when the capacitor 36 charges to the point at which the emitter electrode of the unijunction transistor 46 reaches the appropriate potential as represented by the waveform 42 just before time $t_4$ the unijunction transistor 46 fires to discharge the capacitor 36 through the impedance element 44 which thereupon developes a positive-going voltage pulse at the first base electrode of the unijunction transistor 46 as represented by the pip 48 in the waveform 50 (FIG. 4).

A coupling capacitor 52 is connected to the first base electrode of the unijunction transistor 46, and a diode 54 is connected between the coupling capacitor 52 and the base electrode of the transistor 6, the diode 54 being so poled as to pass a positive voltage pulse. A low back-bias is supplied to the diode 54 by two back-biasing impedance elements 56, 58 connected in series between the terminal 8 and ground, the junction between the elements 56, 58 being connected to the junction between the coupling capacitor 52 and the diode 54. The average level of the voltage pulse represented by the pip 48 in the waveform 50 is raised when it is coupled through the coupling capacitor 52, and the resulting positive voltage pulse, represented by the pip 60 in the waveform 62, is coupled through the diode 54 to the base electrode of the transistor 6.

It will be noted that the positive voltage pulse represented by the pip 60 may be unsuccessful in triggering the multivibrator 2 into oscillation. The pulse may only cause a brief cut-off of current in transistor 6 resulting in a temporary drop of its output voltage as represented by the pip 64 in the waveform 28. If this occurs, the capacitor 36 will recharge as shown in waveform 42 between time $t_4$ and $t_5$, the unijunction transistor 46 will fire when its emitter electrode reaches the appropriate potential relative to the potential difference between its two bases, another voltage pulse will be developed across capacitor-discharging impedance element 44 as shown by the second pip 66 in waveform 50, and the voltage pulse represented by the second pip 68 in waveform 62 will be applied to the base electrode of the transistor 6 to trigger the multivibrator 2 into oscillation. Such development and application of trigger pulses will continue until the multivibrator 2 begins to oscillate; however, the successful resumption of oscillation is shown for illustrative purposes in the waveforms 28, 30 starting at time $t_5$ and continuing beyond time $t_7$.

Figure 2:
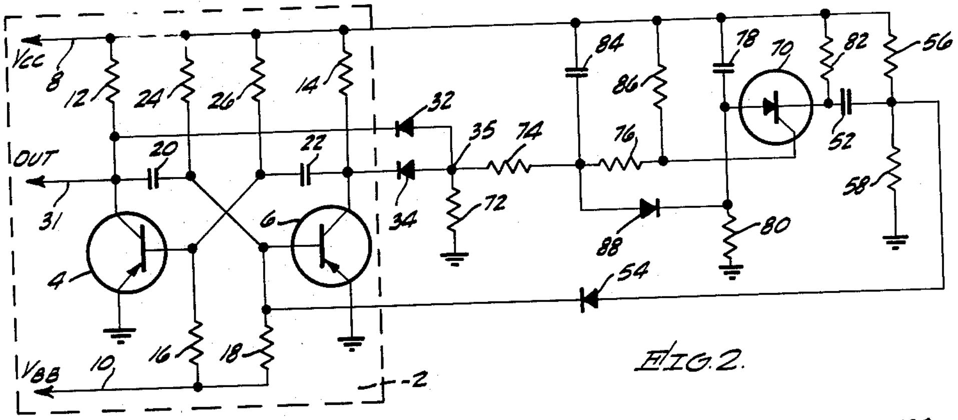
FIG. 2 is a schematic circuit diagram of another signal generator provided in accordance with another embodiment of the present invention illustrating the use of a controlled rectifier device.

FIG. 2 shows another signal generator embodying the invention. In this embodiment the multivibrator 2 is the same as that shown in FIG. 1, but the relaxation oscillator utilizes a silicon controlled rectifier 70 as switching means rather than the unijunction transistor 46. The two gating diodes 32, 34 are the same and are connected in the same way as in FIG. 1. The coupling capacitor 52, the back-biasing impedance elements 56, 58, and the other diode 54 are the same and similarly connected as in FIG. 1. The intermediate circuitry associated with the silicon controlled rectifier 70 is somewhat different, however, and requires some explanation.

Referring to FIG. 2, a first gate current impedance element 72 is connected between the junction point 35 and ground. Two other gate-current impedance elements 74, 76 are connected in series between the junction point 35 and the cathode gate of the silicon controlled rectifier 70. A combination of series-connected circuit elements comprising a capacitor 78 and a capacitor-charging impedance element 80 is connected between the terminal 8 and ground, the junction between the capacitor 78 and the capacitor-charging impedance element 80 being connected to the anode of the silicon controlled rectifier 70. A capacitor-discharging impedance element 82 is connected between the terminal 8 and the cathode of the silicon controlled rectifier 70. The coupling capacitor 52 is connected to the cathode of the silicon controlled rectifier 70. A delaying capacitor 84 is connected between the first source 8 of direct current operating potential and the junction between the second and third gate current impedance elements 74, 76.

While the multivibrator 2 oscillates normally, the diodes 32, 34 conduct alternately to place the potential of the terminal 8 at the junction point 35, and no gate current flows. During this period the capacitor 78 charges through capacitor-charging impedance element 80, and when the capacitor 78 is fully charged the anode of the silicon controlled rectifier 70 is at ground potential. When, through a pulse of radiation or otherwise, the multivibrator 2 assumes a nonoscillatory mode in which the two transistors 4, 6 conduct continuously, the two diodes 32, 34 stop conducting, and the delaying capacitor 84 starts to charge through the first and second gate current impedance elements 72, 74. When the delaying capacitor 84 approaches full charge gate current flows through the three gate current impedance elements 72, 74, 76, thence through the gate of the silicon controlled rectifier 70, thence through the cathode thereof and thence through the capacitor-discharging impedance element 82. When the gate current increases to reach a critical value the silicon controlled rectifier fires, thereby discharging the capacitor 78 through the capacitor-discharging impedance element 82 and developing a positive-going pulse at the cathode of the silicon controlled rectifier 70. This pulse is coupled through the coupling capacitor 52 and the diode 54 to the base of the transistor 6 in the same way and with the same results as mentioned above for the pulse developed at the first base electrode of the unijunction transistor 46 (FIG. 1).

As the capacitor 78 discharges, the current through the silicon controlled rectifier 70 drops until it reaches a critical minimum value determined primarily by the value of the capacitor-charging impedance element 80. At that point the current through the silicon controlled rectifier 70 will stop, despite the possible continuance of gate current if the multivibrator 2 has not yet resumed oscillation. The capacitor 78 will then recharge until the voltage between the cathode and the anode of the silicon controlled rectifier reaches a critical point at which the continuing gate current will fire the rectifier 70. In this way the rectifier 70 and associated circuitry will continue to trigger the multivibrator 2 until it begins to oscillate.

To drain leakage currents and prevent self-firing of the silicon controlled rectifier 70 as a result of temperature increase, a bleeder resistor 86 is connected between the cathode gate of the rectifier 70 and the terminal 8.

To insure that the capacitor 78 will have an opportunity to recharge despite continued failure of oscillation in the multivibrator 2, an additional diode 88 may be connected to reduce the gate current after rectifier 70 fires. The connection would be made between the anode of the silicon controlled rectifier 70 and the junction between the second and third gate current impedance elements 74, 76, the additional diode 88 being poled to conduct current as the potential at the anode of the rectifier 70 becomes less positive as a result of decreasing discharge current across the capacitor-discharging impedance element 82.

Figure 3:
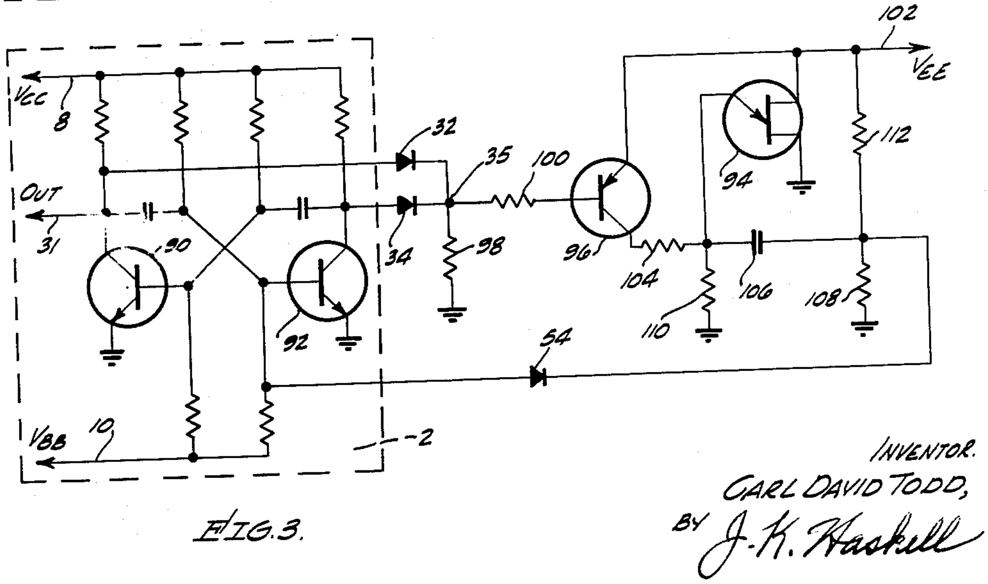
FIG. 3 is a schematic circuit diagram of a signal generator employing a transistor and a unijunction device in accordance with still another embodiment of the invention.

As indicated above, with PNP transistors in the multivibrator 2 a unijunction transistor or a silicon controlled rectifier may be used as part of the relaxation oscillator portion of the feedback means of the invention. Other current-controlled or N-type negative resistance devices may also be used, including but not limited to the PNPN silicon switch and the gas tube. Also as indicated above, however, NPN transistors may be used in the multivibrator 2 in place of the PNP transistors 4, 6 of FIGS. 1 and 2. FIG. 3 shows such a substitution, the two multivibrator transistors 90, 92 being of the NPN type. The voltage at terminal 8 must be of a different value, +20 volts in this case, since the emitter electrodes of the transistors 90, 92 are grounded. Because of this change, conduction of the diodes 32, 34 during oscillation of the multivibrator 2 is accomplished by reversing the polarity of the diodes 32, 34 in the circuit of FIG. 3 as compared with that of FIG. 1. The polarity of the other diode 54 is also reversed to permit cut-off of conduction through the transistor 92 by means of a negative pulse on the base electrode thereof.

Referring further to FIG. 3, a unijunction transistor 94 is used as a switching means, but considerable reorganization of the associated circuitry is necessary, as compared with FIG. 1, including the use of another transistor 96, this of the PNP configuration.

In more detail, a signal-developing impedance element 98 is connected between the junction point 35 and ground. A coupling impedance element 100 is connected to the junction point 35. A third source of direct current operating potential (not illustrated) is provided, connected in proper polarity between a terminal 102 and ground, and the emitter electrode of the third transistor 96 is connected to the terminal 102, the base electrode of the transistor 96 being connected to the terminal of the coupling impedance element 100 most remote from the junction point 35. The collector electrode of the transistor 96 is connected to a small current-limiting resistor 104.

The first base electrode of the unijunction transistor 94 is connected to ground, the second base electrode thereof is connected to the terminal 102, and the emitter electrode thereof is connected to the terminal of the current-limiting resistor 104 most remote from the collector electrode of the other transistor 96. A capacitor 106 is connected to the emitter electrode of the unijunction transistor 94, and a capacitor-charging-and-discharging impedance element 108 is connected between ground and the terminal of the capacitor 106 most remote from the emitter electrode of the unijunction transistor 94. A bleeder resistor 110 is connected between ground and the emitter electrode of the unijunction transistor 94, the cathode of the diode 54 is connected to the junction between the capacitor 106 and the impedance element 108, and a back-biasing impedance element 112 is connected between that junction and the terminal 102.

During oscillation of the multivibrator 2 the two diodes 32, 34 conduct alternately to place a positive potential at the junction point 35, thereby preventing emitter-to-collector current flow in the transistor 96. The capacitor 106 therefore contains little charge at this time. When the multivibrator assumes the nonoscillatory mode in which the two transistors 90, 92 are saturated, the two diodes 32, 34 do not conduct and the base electrode of the transistor 96 swings toward ground, thereby starting emitter-to-collector conduction in transistor 96. Because the bleeder resistor 110 is large compared with the capacitor-charging-and-discharging impedance element 108, the capacitor 106 begins to charge through the latter, thereby increasing the potential at the emitter electrode of the unijunction transistor 94. When the critical firing potential on that emitter electrode is reached, the unijunction transistor 94 fires thereby discharging the capacitor 106, the path of discharge being from one terminal of the capacitor 106, through the emitter electrode of the unijunction transistor 94, across the emitter-first base junction, through the first base electrode of the unijunction transistor 94 to ground, and from ground through the impedance element 108 to the other terminal of the capacitor 106. The discharge develops a negative voltage pulse at the junction between the capacitor 106 and the impedance element 108, and this pulse is coupled through the diode 54 to the base of the transistor 92 in the multivibrator to temporarily stop conduction therein and cause the multivibrator 2 to resume oscillation. Back-biasing impedance element 112 serves the same function in the circuit of FIG. 3 as back-biasing impedance element 56 in the circuits of FIGS. 1 and 2.

There have thus been revealed three embodiments of the invention disclosed herein. The emvodiments are not intended, however, to limit the scope of the invention, other embodiments being apparent to those skilled in the art.

What is claimed is:

1. A signal generator comprising:

an astable multivibrator including two current paths and having an oscillatory mode in which said paths alternate with each other in conducting current and a nonoscillatory mode in which said paths conduct current continuously; and feedback means including first gating means coupled to said paths for developing a voltage signal in response to the continuous conduction of current in said paths, a relaxation oscillator coupled to said first gating means for generating a trigger pulse in response to said voltage signal, and second gating means coupled between said relaxation oscillator and one of said paths and responsive to said pulse for temporarily reducing the conduction of current in said one of said paths to trigger said multivibrator into said oscillatory mode.

2. A signal generator comprising:

an astable multivibrator including two current paths each with control means and having an oscillatory mode in which said paths alternate with each other in conducting current and a nonoscillatory mode in which said paths conduct current continuously; and feedback means including first gating means coupled to said paths for developing a voltage signal in response to the continuous conduction of current in said paths, a relaxation oscillator coupled to said first gating means for generating a trigger pulse in response to said voltage signal, and second gating means coupled between said relaxation oscillator and the control means for one of said paths and responsive to said pulse for temporarily reducing the conduction of current in said one of said paths to trigger said multivibrator into said oscillatory mode.

3. A signal generator comprising:

an astable multivibrator including two current paths each with control means and having an oscillatory mode in which said paths alternate with each other in conducting current and a nonoscillatory mode in which said paths conduct current continuously; and feedback means including first gating means coupled to said paths for providing a voltage signal in response to the continuous conduction of current in said paths, a source of direct current operating potential, a capacitor coupled between said source and said first gating means for charging in response to said voltage signal, switching means coupled to said capacitor for discharging said capacitor in response to a predetermined potential difference across said capacitor, impedance means coupled to said switching means for developing a trigger pulse in response to the discharge of said capacitor, and second gating means coupled between said impedance means and the control means for one of said paths and responsive to said pulse for temporarily reducing the conduction of current in said one of said paths to trigger said multivibrator into said oscillatory mode.

4. A signal generator comprising:
an astable multivibrator including two current paths each with control means and having an oscillatory mode in which said paths alternate with each other in conducting current and a nonoscillatory mode in which said paths conduct current continuously; and
feedback means including first gating means coupled to said paths for providing a voltage signal in response to the continuous conduction of current in said paths, a source of direct current operating potential, a source of fixed reference potential, a combination of circuit elements including a capacitor and a resistor connected in series and coupled between said sources for charging said capacitor to a predetermined level, switching means coupled to said first gating means and said capacitor for discharging said capacitor in response to said voltage signal, impedance means coupled to said switching means for developing a trigger pulse in response to the discharge of said capacitor, and second gating means coupled between said impedance means and the control means for one of said paths and responsive to said pulse for temporarily reducing the conduction of current in said one of said paths to trigger said multivibrator into said oscillatory mode.

5. A signal generator comprising:
an astable multivibrator including two current paths each with control means and having an oscillatory mode in which said paths alternate with each other in conducting current and a nonoscillatory mode in which said paths conduct current continuously; and
feedback means including first gating means coupled to said paths for providing a voltage signal in response to the continuous conduction of current in said paths, a source of direct current operating potential, a source of fixed reference potential, a series-connected combination of circuit means coupled between said sources and including a capacitor, a resistor and additional control means coupled to said first gating means for charging said capacitor from said sources in response to said voltage signal; switching means coupled to said capacitor for discharging said capacitor in response to a predetermined potential difference across said capacitor, said resistor developing a trigger pulse in response to the discharge of said capacitor, and second gating means coupled between said resistor and the control means for one of said paths and responsive to said pulse for temporarily reducing the conduction of current in said one of said paths to trigger said multivibrator into said oscillatory mode.

6. A signal generator comprising:
first and second sources of direct current operating potential;
a source of fixed reference potential;
an astable multivibrator including first and second semiconductor devices each having a control electrode, a collector electrode and an emitter electrode, said emitter electrode being connected to said source of fixed reference potential, first alternating current feedback means connected between the collector electrode of said first semiconductor device and the control electrode of said second semiconductor device, second alternating current feedback means connected between the collector electrode of said second semiconductor device and the control electrode of said first semiconductor device, a load impedance element connected between said first source of direct current operating potential and the collector electrode of each of said semiconductor devices, and first and second biasing means each connected between said first and second sources of direct current operating potential and including two series-connected biasing impedance elements with a common junction connected to the control electrode of a corresponding one of said semiconductor devices, said multivibrator having an oscillatory mode in which said semiconductor devices alternate with each other in conducting current and a nonoscillatory mode in which said semiconductor devices conduct current continuously; and
other feedback means responsive to said nonoscillatory mode for triggering said multivibrator into said oscillatory mode including first and second diodes each having a cathode connected to the collector electrode of a corresponding one of said semiconductor devices and an anode connected to the anode of the other one of said diodes, a capacitor charging impedance element connected between said source of fixed reference potential and said anodes, a capacitor coupled between said first source of direct current operating potential and said anodes, a unijunction transistor having an emitter electrode and first and second base electrodes, said emitter electrode of said unijunction transistor being coupled to said anodes, and said second base electrode being coupled to said source of fixed reference potential, a capacitor-discharging impedance element coupled between said first base electrode and said first source of operating potential, a coupling capacitor connected to said first base electrode, two series-connected back-biasing impedance elements coupled between said first source of direct current operating potential and said source of fixed reference potential and having an intermediate junction connected to the terminal of said coupling capacitor most remote from said first base electrode, and a third diode having an anode coupled to said intermediate junction and a cathode coupled to the control electrode of one of said semiconductor devices of said multivibrator.

7. A signal generator comprising:
first and second sources of direct current operating potential;
a source of fixed reference potential;
an astable multivibrator including first and second semiconductor devices each having a control electrode, a collector electrode and an emitter electrode, said emitter electrode being connected to said source of fixed reference potential, first alternating current feedback means connected between the collector electrode of said first semiconductor device and the control electrode of said second semiconductor device, second alternating current feedback means connected between the collector electrode of said second semiconductor device and the control electrode of said first semiconductor device, a load impedance element connected between said first source of direct current operating potential and the collector electrode of each of said semiconductor devices, and first and second biasing means each connected between said first and second sources of direct current operating potential and including two series-connected biasing impedance elements with a common junction connected to the control electrode of a corresponding one of said semiconductor devices, said multivibrator having an oscillatory mode in which said semiconductor devices alternate with each other in conducting current and a nonoscillatory mode in which said semiconductor devices conduct current continuously; and other feedback means responsive to said nonoscillatory mode for triggering said multivibrator into said oscillatory mode including first and second diodes each having a cathode coupled to the collector electrode of a corresponding one of said semiconductor devices and an anode connected to the anode of the other of said diodes, a first gate current impedance element connected between said source of fixed reference potential and said anodes, a second gate current impedance element connected to said anodes, a first capacitor coupled between said first source of direct current operating potential and the terminal of said second gate current impedance element most remote from said anodes, a combination of circuit elements including a second capacitor and a capacitor-charging impedance element connected in series and coupled between said first source of direct current operating potential and said source of fixed reference potential, a silicon controlled rectifier with an anode, a cathode and a gate electrode, said anode being coupled to the junction between said second capacitor and said capacitor-charging impedance element, a third gate current impedance element connected between said gate electrode and the junction between said first capacitor and said second gate current impedance element, a capacitor-discharging impedance element coupled between the cathode of said silicon controlled rectifier and said first source of operating potential, a coupling capacitor connected to the cathode of said silicon controlled rectifier, two series-connected back-biasing impedance elements coupled between said first source of direct current operating potential and said source of fixed reference potential and having an intermediate junction connected to the terminal of said coupling capacitor most remote from the cathode of said silicon controlled rectifier, and another diode having an anode coupled to said intermediate junction and a cathode coupled to the control electrode of one of said semiconductor devices of said multivibrator.

8. A signal generator comprising:

first, second and third sources of direct current operating potential;

a source of fixed reference potential;

an astable multivibrator including first and second semiconductor devices each having a control electrode, a collector electrode and an emitter electrode, said emitter electrode being connected to said source of fixed reference potential, first alternating current feedback means connected between the collector electrode of said first semiconductor device and the control electrode of said second semiconductor device, second alternating current feedback means connected between the collector electrode of said second semiconductor device and the control electrode of said first semiconductor device, a load impedance element connected between said first source of direct current operating potential and the collector electrode of each of said semiconductor devices, and first and second biasing means each connected between said first and second sources of direct current operating potential and including two series-connected biasing impedance elements with a common junction connected to the control electrode of a corresponding one of said semiconductor devices, said multivibrator having an oscillatory mode in which said semiconductor devices alternate with each other in conducting current and a nonoscillatory mode in which said semiconductor devices conduct current continuously; and other feedback means responsive to said nonoscillatory mode for triggering said multivibrator into said oscillatory mode including first and second diodes each having an anode coupled to the collector electrode of a corresponding one of said semiconductor devices and a cathode connected to the cathode of the other of said diodes, a signal-developing impedance element connected between said source of fixed reference potential and said cathodes, a third semiconductor device having an emitter electrode, a collector electrode and a control electrode, the emitter electrode of said third semiconductor device being connected to said third source of direct current operating potential and the control electrode of said third semiconductor device being coupled to said cathodes, a capacitor coupled to the collector of said third semiconductor device, a capacitor-charging-and-discharging impedance element connected between said source of fixed reference potential and the terminal of said capacitor most remote from the collector of said third semiconductor device, a unijunction transistor having an emitter electrode and first and second base electrodes, said first base electrode being connected to said source of fixed reference potential, said second base electrode being connected to said third source of direct current operating potential, and the emitter electrode of said unijunction transistor being connected to the terminal of said capacitor coupled to the collector of said third semi-conductor device, a leakage-current-reducing impedance element connected between said source of fixed reference potential and the emitter electrode of said unijunction transistor, a back-biasing impedance element connected between said third source of direct current operating potential and the junction between said capacitor and said capacitor-charging-and-discharging impedance element, and a third diode having a cathode connected to the junction between said back-biasing impedance element and said capacitor and an anode connected to the control electrode of one of said semiconductor devices of said multivibrator.

References Cited by the Examiner

UNITED STATES PATENTS

| | | | |
|---|---|---|---|
| 3,085,211 | 4/1963 | Jensen et al. | 331—52 |
| 3,176,242 | 3/1965 | Dyer et al. | 331—113.1 |

ROY LAKE, *Primary Examiner.*

S. H. GRIMM, *Assistant Examiner.*